United States Patent [19]
Forster et al.

[11] 3,746,957
[45] July 17, 1973

[54] APPARATUS FOR REMOTE CONTROL OF POSITIONING AND DRIVE MEMBERS FOR PRINTING MACHINES

[75] Inventors: Karl-Heinz Forster, Dresden; Lothar Vetter, Radebeul; Hans Johne, Radebeul; Klaus Schanze, Radebeul, all of Germany

[73] Assignee: VEB Polygraph Leipzig Druckmaschinenwerk Planeta Rabebeul, Radebeul, Germany

[22] Filed: Sept. 16, 1970

[21] Appl. No.: 72,737

[52] U.S. Cl............... 318/696, 318/341, 318/85, 318/41
[51] Int. Cl. ................................... H02k 37/00
[58] Field of Search................. 318/138, 254, 696, 318/685, 85, 41, 341, 345, 635; 310/49

[56] References Cited
UNITED STATES PATENTS

| | | | |
|---|---|---|---|
| 3,473,069 | 10/1969 | Herbert............................ | 318/138 |
| 3,588,661 | 6/1971 | Newell............................. | 318/696 |
| 3,522,501 | 4/1970 | Nyman............................. | 318/138 |
| 3,217,221 | 11/1965 | Heggen et al.................... | 318/696 X |
| 3,268,785 | 8/1966 | Gerber et al.................... | 318/68 S |
| 3,465,225 | 9/1969 | O'Regan et al.................. | 318/138 |
| 3,441,821 | 4/1969 | Tomota et al.................... | 318/138 |
| 3,466,520 | 9/1969 | Aylikci et al.................... | 318/696 |
| 3,345,547 | 10/1967 | Dunne............................. | 318/696 |
| 3,411,058 | 11/1968 | Madsen et al................... | 318/696 |
| 3,127,548 | 3/1964 | Van Emden..................... | 318/696 |
| 3,586,953 | 6/1971 | Markkanen...................... | 318/685 |
| 3,581,185 | 5/1971 | Comstock........................ | 318/685 |
| 3,218,535 | 11/1965 | Holthaus et al................. | 318/685 |

Primary Examiner—G. Simmons
Attorney—Nolte and Nolte

[57] ABSTRACT

A remote control arrangement for the positioning and drive members, for example, of a printing machine, in which stepping motors are coupled to the positioning or drive members. The stepping motors are controlled by a control network which is responsive to a single input pulse of determined duration for applying a series of successive control pulses to the stepping motors, so that the rotors of the stepping motors are in electrically similar positions, with respect to their stators, before and after each control pulse series. Means are provided for mechanically coupling the stepping motors to their respective positioning and drive members to obtain stepwise axial movement or rotation of the positioning or drive members. An input circuit of the control network may be provided to enable single step movement, continuous movement, or continuous movement for a preselected number of steps.

11 Claims, 18 Drawing Figures

KARL-HEINZ FORSTER
LOTHAR VETTER
HANS JOHNE
KLAUS SCHANZE
INVENTORS

BY Nolte & Nolte
ATTORNEY

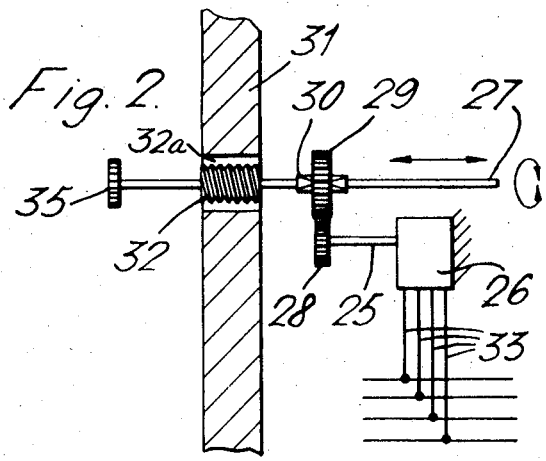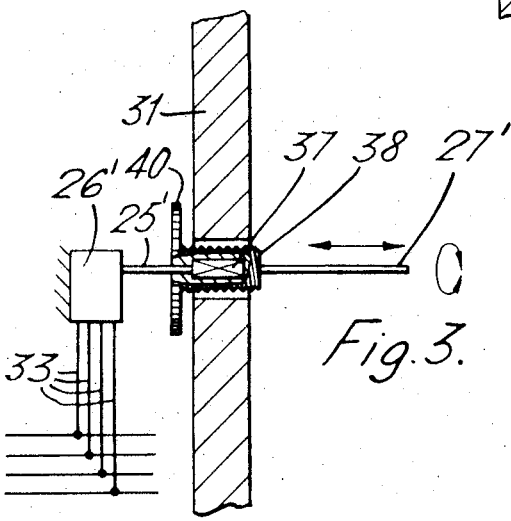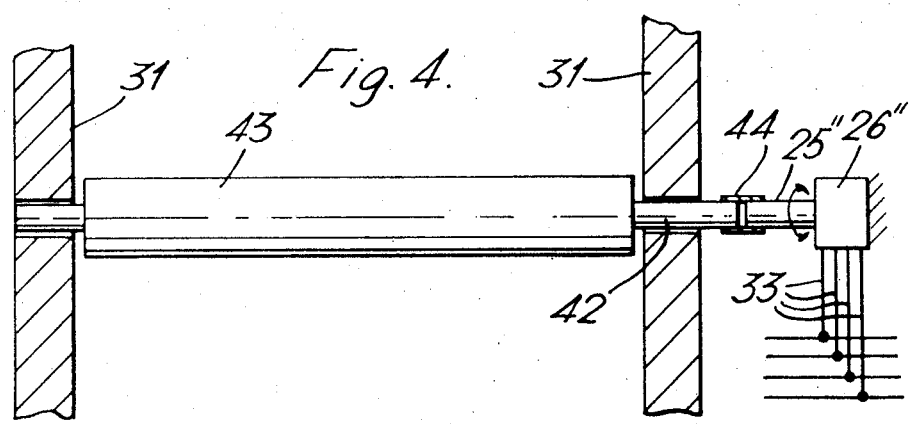

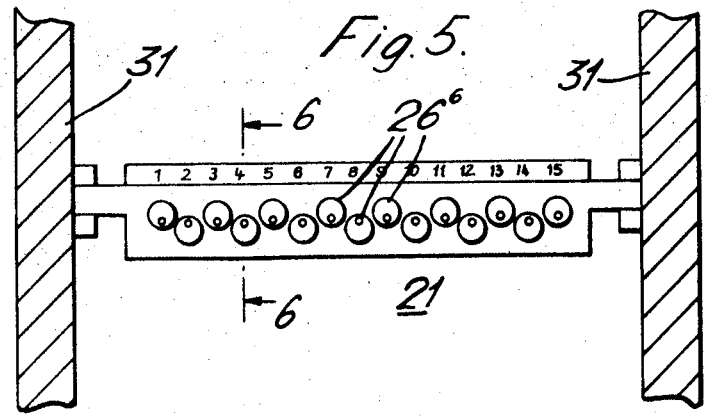
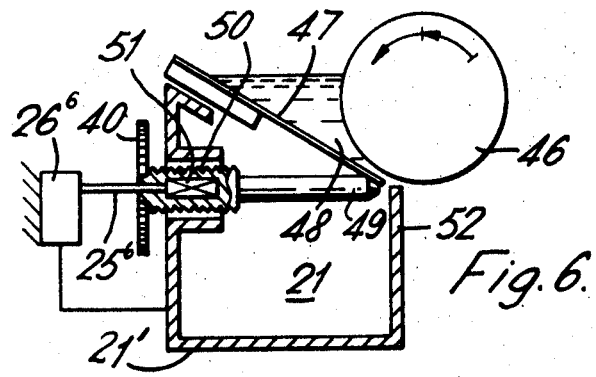
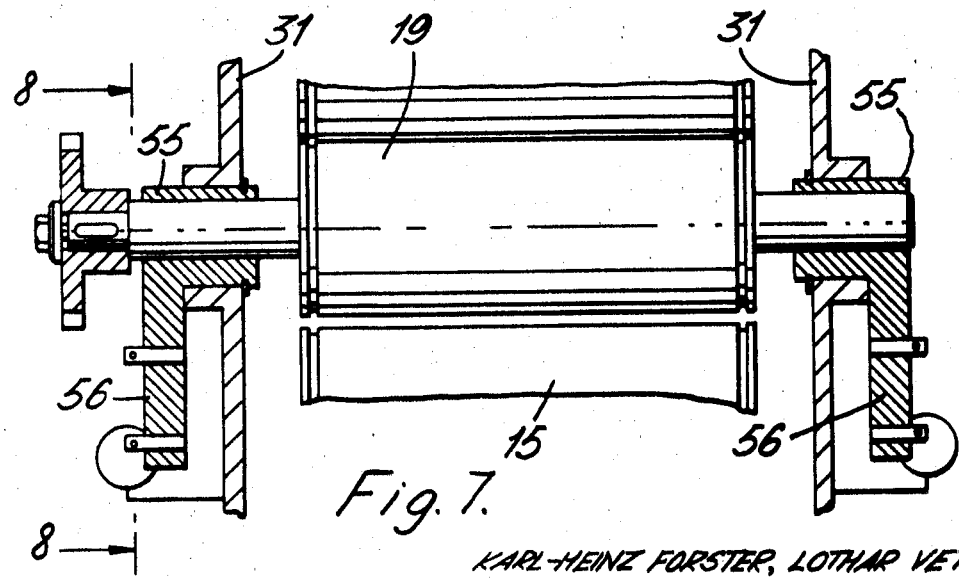

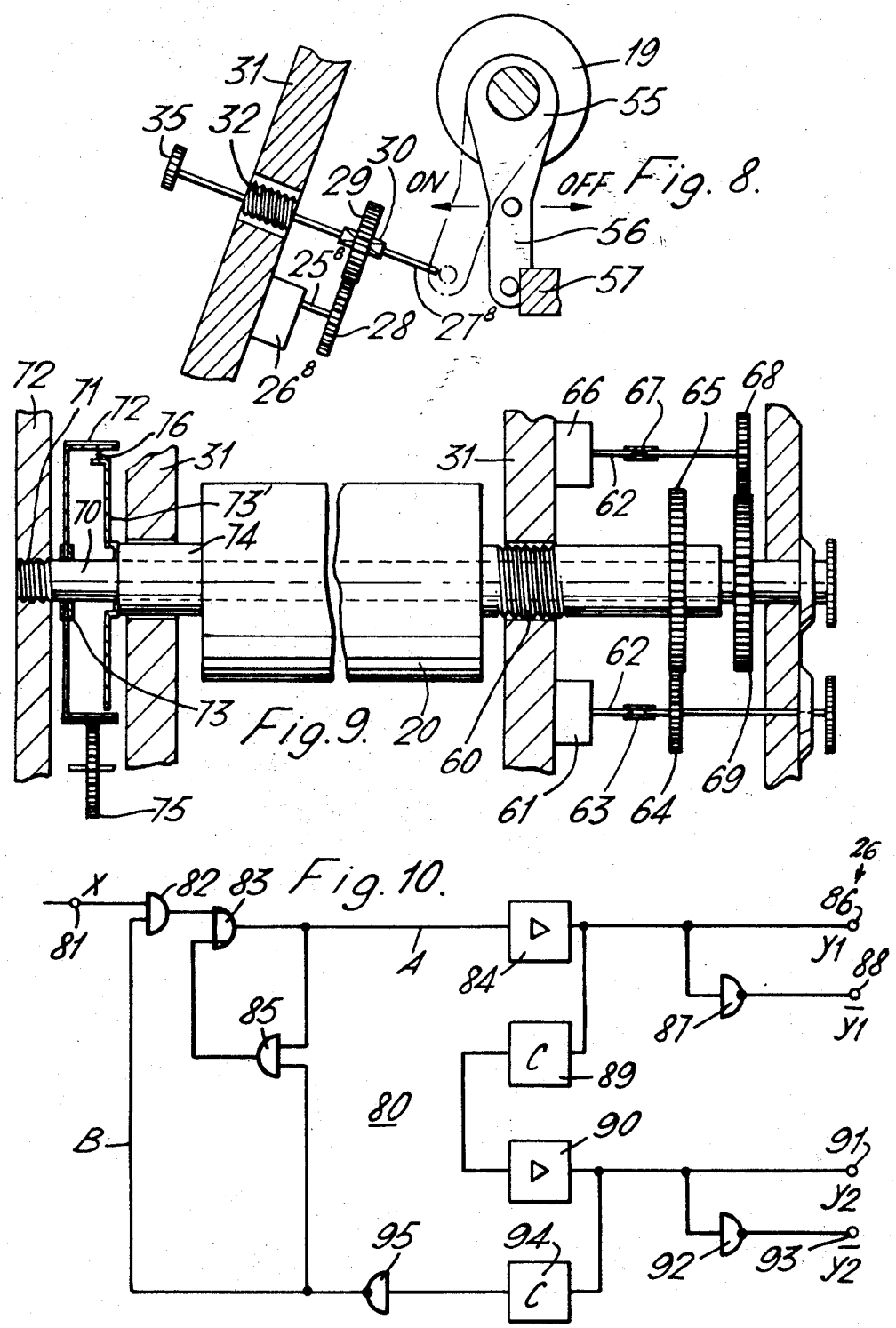

APPARATUS FOR REMOTE CONTROL OF POSITIONING AND DRIVE MEMBERS FOR PRINTING MACHINES

This invention relates to a method and apparatus for the remote control of positioning and drive members, and is particularly directed to the control of positioning and drive members, such as zone screws in ink and wetting agent dispensing devices of printing machines. While the following specification is particularly directed to the application of the invention in printing machines, it will be apparent that the invention is adaptable to other devices, and the limitation of the disclosure to a single type of device is thus solely for the purpose of describing a suitable and particularly advantageous embodiment of the invention.

Positioning members for printing machines are required for the control of certain processes, for example, for controlling the supply of ink and wetting agent dispensing devices, and for the control of lateral and circumferential registration, as well as the adjustment of the inking rollers. In addition, drive members are also required for the controllable, stepwise motion of certain parts of the printing machines, such as the ink and wetting agent drop rollers. A relatively large amount of manual effort is involved in the operation of the positioning members, since these members are located at a number of various positions on the printing machine. In order to reduce the manual effort required to control the machines, it is of course desirable to increase the extent to which the machines are automated, and it is consequently desirable to provide means for controlling the positioning and drive members from a central position. It is furthermore desirable that the control provided be adapted for use in a control loop, so that automatic operation of the control is feasible.

West German Pat. No. 1,239,709, discloses means for remotely controlling the ink zone screws of a printing machine, in which the drive gears of a gear box are connected to the ink zone screws by means of a reversible serrated drive belt, employing remotely controllable magnets to permit the adjustment of the ink zone screws. In this arrangement, a limit switch is operatively connected to the drive wheel of the drive belt for actuating a signal light, so that the number of light pulses from the signal light indicates the extent of travel of the ink zone screws. Furthermore, a stop and decoupling unit are provided in order to limit the travel of ink zone screws. This arrangement has the disadvantage that accurate positioning cannot be obtained, and that positioning steps obtained during the control of the device cannot be accurately reproduced. This limitation on the control of the drive is a result of the use of a drive having a stretchable belt, since a coupling employing a serrated belt and a gear such as disclosed in the above patent may permit distance variation of half a tooth pitch. In addition, the accuracy of control is limited by the use of a pulsing signal lamp for the control. The arrangement therefore does not provide a device having high operating efficiency. In addition, the arrangement is not readily adaptable for use in a control loop. The design of the apparatus is quite complicated and expensive from the standpoint of gearing mechanics, especially due to the type of decoupling unit required.

In another arrangement for the remote control of rotatable positioning members, West German Pat. No. 1,256,227 discloses a system, in which magnetically controlled coupling elements are provided connecting continuously rotating threaded spindles with the drive gears of the ink zone screws. In order to control the "on" time of the control magnets, this arrangement provides actuating members which are adjustable in both directions of rotation. Timing switches are employed in association with the control magnets. In this arrangement, the ink zone screws are rotated through the same angle as the actuating members.

Aside from the fact that this arrangement is very complicated, the arrangement of West German Pat. No. 1,256,227 also has the disadvantage that accurate positioning steps cannot be obtained, and that the positioning steps cannot be accurately reproduced. This disadvantage arises from the fact that the coupling elements are controlled as a function only of time, and the dependence of the drive upon loading is not taken into consideration. In addition, the design of the coupling arrangement permits distance variations of half of a tooth pitch. This arrangement also has the disadvantage that damage to the ink drop roller may occur as a result of the absence of means for limiting the travel.

In another prior art arrangement, West German Pat. No. 1,257,164 discloses means for remotely controlling of registration adjustment in which two ratchet wheels with oppositely directed teeth are mounted on the positioning shaft, and the shaft is also provided with a hand wheel. In this arrangement, remotely controllable feed arrangements, such as hydraulic cylinders or magnets, are coupled to the pawls which are associated with the ratchet wheels.

This arrangement has the disadvantage that relatively large ratchet diameters and numbers of teeth are required as the size of the control steps depends on the size and number of teeth of the ratchet, and a small step size is necessary for accurate control. In addition, the design of the arrangement is very expensive and complicated. The arrangment has the further disadvantage that only one step can be performed at a time, so that step series are not feasible, and in addition, due to the use of the ratchet drive, accurate positioning steps and accurate reproducible positioning cannot be obtained. Furthermore, the system of this patent is not adaptable for use in a control loop.

West German Pat. No. 1,140,207 discloses a system for the intermittent drive and continuous change of the angle of rotation of fountain rollers in inking and wetting mechanisms, in which the drive is achieved by means of a coupling mechanism which can be moved by a crank mechanism, and in which the outer rocker arm has a movable fulcrum for continuously changing the switching range. This arrangement has the disadvantage that a large expenditure is required for the gearing mechanisms, the expenditure being further increased by the requirement that remote control of the continuous change of the angle of rotation be provided. In addition, variation in the size of the control step is unavoidable due to the large number of transmission elements which are provided, so that accurate reproducible steps cannot be obtained.

In order to change the piston stroke of ink pumps in ink metering devices of vertical printing presses, U. S. Pat. No. 3,366,051 discloses the use of stepping motors. This arrangement has the disadvantage that the usual control of the stepping motors by way of electronic control switches having pulse generators, coupling gauges and flip flop circuits, requires extensive circuitry. The amount of circuitry employed is further increased if a multiplicity of stepping motors is used, as for example, in ink metering arrangements, since only one stepping motor can be associated with each electronic control switch.

It is therefore an object of this invention to provide a method and apparatus for reducing the cost and amount of equipment required for the remote control of positioning and drive members of printing machines, as well as to increase the ease of operation of such machines by providing means so that the operation may be controlled from a central point.

It is a further object of the invention to provide a method and apparatus for adjusting or driving positioning members, groups of positioning members and drive members in printing machines without requiring extensive gearing and controls, wherein the adjustment or drive control is effected from a central operation point, and wherein the arrangement is adaptable to integration into a control loop.

According to the invention, the above described disadvantages of previous control arrangements are obviated by providing a control network that is excited by a single pulse of given duration. In this arrangement, the control network transmits a series of control pulses to one or more stepping motors. The stepping motors are controlled so that the rotors and stators of each motor assume electrically equal positions at the start and finish of each control step. The positioning members, groups of positioning members and drive members are connected to the stepping motors, so that they can be moved in defined reproducible single steps or series of steps, with predetermined running speeds and numbers of steps to be executed, and the members are returnable to defined starting positions. In this arrangement, the control network with an input device is operatively associated with the stepping motors, and the stepping motors are connected by way of stepping motor gear units, to positioning members and/or drive members for the motions of the printing machine which are to be driven intermittently.

A threaded spindle, rotatably supported in the frame of the printing machine, is designed as the positioning member for the stepwise movement and intermittent rotation of positioning members in printing machines, and the threaded spindle is connected to a stepping motor gear unit by way of a multi-profile coupling.

According to another embodiment of the invention, a threaded bushing is supported in the printing machine frame by way of external threads, the threaded bushing being coupled to control the positioning members. The threaded bushing is furthermore connected to a stepping motor by way of a multi-profile coupling in the interior of the bushing, for effecting the stepwise movement and rotation of the corresponding positioning members in the printing machine.

According to a further embodiment of the invention, a stepping motor may be connected by way of a clutch to the drive shaft of the part of the printing machine which is to be driven intermittently.

The control network for the control of the stepping motors is designed so that its input constitutes the first input of a first AND circuit, and that an OR circuit and a first amplifier are connected in that order to the output of the first AND circuit. The output of the first amplifier constitutes a $y_1$ output, and a first inverter connected to the output of the first amplifier provides a $\bar{y}_1$ output of the control network. The output of the first amplifier is also applied to a first delay stage, and then to another amplifier, the output of the other amplifier constituting a $y_2$ output. A second inverter, connected to the other amplifier, provides a $\bar{y}_2$ output of the control network. The output of the second amplifier is also connected to a second delay stage and a third inverter, the output of the third inverter representing one of the inputs of the AND circuit, as well as the first input of a further AND circuit. The second input of the further AND circuit is connected to the OR circuit, and the output of the second AND circuit provides the second input of the OR circuit. A monostable multivibrator and a manually or machine operated input device is provided in combination with the control network for single step positioning.

According to a still further embodiment of the invention, an adjustable astable multivibrator and a manually or machine operated input member are provided in combination with the control network, for the periodic continuous movement of driving members of the printing machine.

According to a still further embodiment of the invention, an astable multivibrator and a preceeding AND circuit are provided in combination with the control network for the periodic continuous movement of drive members of the printing machine, in order to permit preselection of the number of steps to be executed. In this embodiment, the first input of the AND circuit is formed by a manually or machine operated input device, and the second input of the AND circuit is formed by the output of the astable multivibrator by way of a counter having a preselectable pulse output, and an inverter.

In order to indicate the position of the positioning members in the printing machine, a forward and backward counting pulse counter is provided in combination with the stepping motor. The number of switching pulses supplied by the control network can be indicated by the pulse counter, and the pulse counter can be interrogated to provide an indication of the number of switching pulses supplied. According to a modification of this arrangement, a coded disk and a pointer are provided in combination with the stepping motor for indicating the position of the positioning members.

When the invention is employed in multi-color printing presses, common stepping motor control members and devices for the reversal of the direction of rotation are provided for each station of the printing press, with the groups of stepping motors being duplicated for each station. In this arrangement, station selection control members and start input devices for the control members are provided corresponding to each station, and the control members are arranged on a common control panel.

The invention will now be described in greater detail with reference to the accompanying drawings, in which:

FIG. 2 is a sketch illustrating a manner in which a stepping motor may be employed to control a positioning member for stepwise translation and intermittent rotation of the positioning member, in which the axis of the positioning member is parallel to the stepping motor axis;

FIG. 3 is a sketch illustrating a manner in which a stepping motor may be employed to control a positioning member for stepwise translation and intermittent rotation of the positioning member, in which the stepping motor shaft and positioning member are coaxial;

FIG. 4 is a sketch illustrating a manner in which a stepping motor may be directly coupled to drive an element of the printing machine, for example, for the drop roller drive of the printing machine;

FIG. 5 is a sketch illustrating the disposition of the stepping motor at a fluid dispensing device of a printing machine;

FIG. 6 is a cross-sectional view of the arrangement of FIG. 5 taken along the lines 6—6;

FIG. 7 is a partially cross-sectional view of a typical arrangement for positioning a stepping motor at the pressure control of a printing machine according to the invention;

FIG. 8 is a cross-sectional view of the arrangement of FIG. 7 taken along the lines 8—8;

FIG. 9 is a partially cross-sectional view of an arrangement according to the invention in which stepping motors are provided at the lateral and circumferential registration adjustment portion of a printing machine;

FIG. 10 is a block diagram of a network for the control of a stepping motor according to the present invention;

Figure 1:
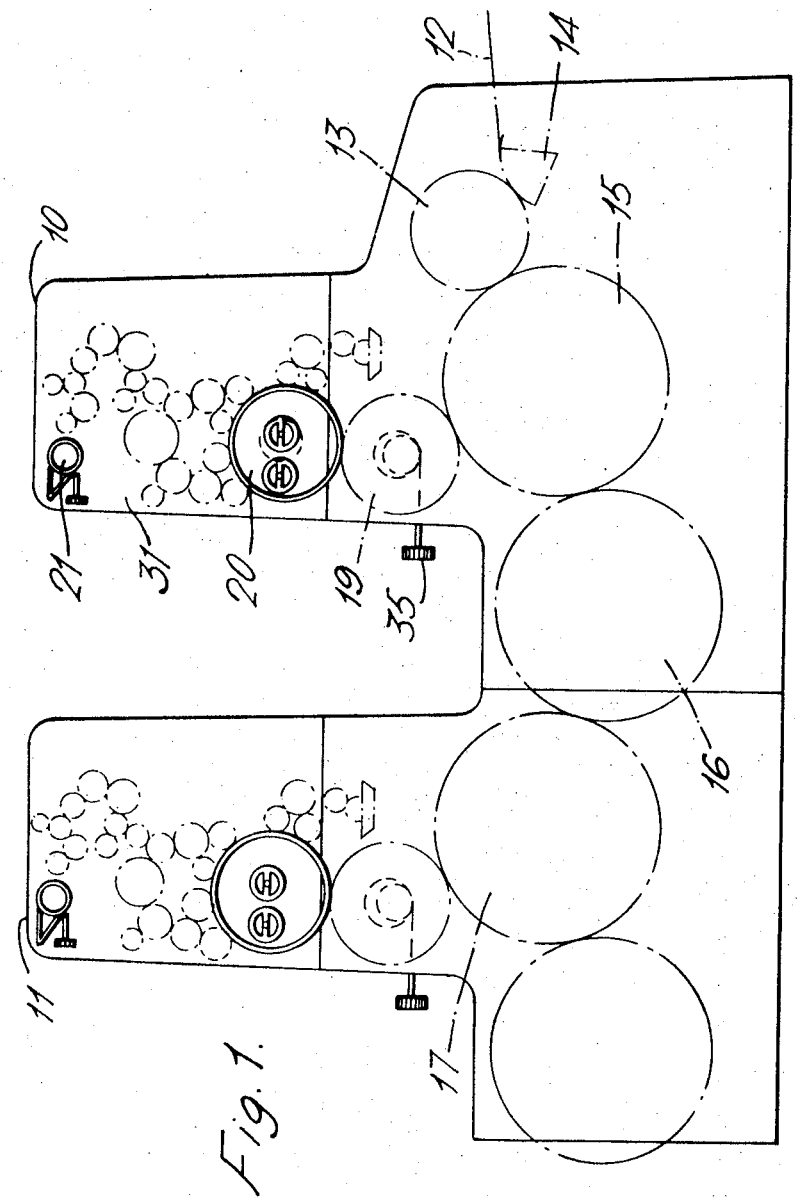
FIG. 1 is a simplified sketch of a typical printing press, and illustrating typical locations on the press at which the control arrangements according to the invention may be employed.

Referring now to the drawings, and more in particular to FIG. 1, therein is shown a schematic illustration of a printing press having two stations, 10 and 11 respectively. This figure is intended to clarify the following disclosure, which refers to various components of typical printing presses, and it is hence not believed necessary to illustrate a printing press in detail. In order to further clarify the following disclosure, a brief description of the passage of a sheet of material to be printed through the printing press will now be described.

Sheets to be printed are fed through the printing press successively from known sheet feeding devices, the speed of feeding of the sheets depending upon the operating speed of the printing press. The sheets are fed from a feed table 12 to a feed cylinder 13 by way of a known rocking device 14. From the feed cylinder 13, the sheet is passed on, by known sheet gripping devices, to the printing cylinder 15. The sheet is then transferred from the printing cylinder 15 to a transfer cylinder 16, and then to the printing cylinder 17 of the next station 11. A sheet depositing device, not shown, is provided to receive sheets from the second station. The printing cylinder 15 cooperates with an offset cylinder 19, and a plate cylinder 20 cooperates with the offset cylinder 19. The printing pressure between the printing cylinder 15 and the offset cylinder 19 may be adjusted by a pressure control arrangement, which is illustrated in more detail in FIG. 7. In order to adjust registration of the printing press, a registration adjusting arrangement, which is illustrated in more detail in FIG. 9, is also arranged at the plate cylinder 20. The inking of the printing plate on the plate cylinder 20 is achieved by an inking mechanism, which consists of an ink metering device 21 (illustrated in more detail in FIG. 5), and a plurality of inking rollers.

The control systems according to the present invention employ stepping motors of the type which are responsive to input pulses to rotate their shafts, so that the rotors have electrically equal positions before and after each shaft rotation step. The operation of the rotors will be explained in greater detail in the following disclosure, and the general nature of such motors will suffice for the description of the various driving systems shown in FIGS. 2 through 9.

FIGS. 2 through 4 illustrate generally the different manners in which stepping motors can be interconnected with movable members of a printing press to effect desired controls. For example, FIG. 2 illustrates a control arrangement in which the shaft 25 of a stepping motor 26 is parallel to the axis of a positioning member, such as a shaft 27. In this arrangement, the shaft 25 of the stepping motor is connected to a gear 28, which is positioned to rotate a gear 28 coupled to the shaft 27. The coupling between the gear 29 and the shaft 27 includes a multi-profile coupling 30 positioned within the gear 29 so that rotation of gear 29 is transferred to the shaft 27, with the shaft 27 being free to move axially within the gear 29 without affecting the rotational coupling. The shaft 27 passes through the frame 31 of the printing apparatus, and an enlarged threaded spindle 32 is formed on the shaft 27 where the shaft passes through the frame. The threads on the spindle 32 engage mating threads in an interiorly threaded bushing 32a rigidly held in the wall of the frame, for supporting the shaft 27, so that an axial movement is imparted to the shaft 27 when the shaft is rotated by means of the stepping motor 26. Thus, each stepwise energization of the motor 26 effects a stepwise rotation of the shaft 27 as well as a stepwise axial movement of the shaft 27. The shaft 27 is suitably coupled to effect an adjustment in the printing machine, as will be described in more detail in the following paragraphs. The stepping motor 26 is provided with suitable electrical leads 33.

A control knob 35 may be provided on the external end of the shaft 27 to permit manual adjustment.

In the arrangement of FIG. 3, the shaft 25' of the stepping motor 26' is coaxial with respect to the shaft 27'. In this arrangement, the shaft 25' of the stepping motor is directly connected to a multi-profile coupling 37 within an enlarged threaded spindle 38 on the end of the shaft 27'. As in the case of the arrangement of FIG. 2, threads are provided in the aperture in the frame 31 through which the spindle 38 extends, so that rotation of the shaft 25' effects rotation of the shaft 27' by way of the coupling 37, and the rotation of the shaft 27' is accompanied with axial movement of the shaft, due to the threaded spindle 38. Manual adjustment may be obtained by employing a knob 40 on the external side of the threaded spindle 38. It should be pointed out that in the arrangements of FIGS. 2 and 3, while use may be made of both the stepwise rotation and axial movement of the shaft 27, alternatively, either one of these movements may be employed separately for actuation of positioning members.

Referring now to FIG. 4, therein is illustrated an arrangement employing a stepping motor 26" having a shaft 25" directly coupled to the shaft 42 of a roller 43, by way of a coupling 44. In this arrangement the axis of the shaft of the stepping motor is coaxial with the axis of the roller, and the stepping motor only imparts stepwise rotational movements to the roller. The roller 43 may, for example, be an ink or wetting agent drop roller.

FIGS. 5 – 9 are simplified sketches illustrating various arrangements for employing stepping motors in combination with specific positioning members typically found in printing presses. For example, FIGS. 5 and 6 illustrate the use of stepping motors for controlling an ink metering device, such as the device 21 illustrated in FIG. 1. Referring now to FIGS. 5 and 6, the ink metering device 21 is mounted between opposite frame plates 31 of the printing machine, and includes a rotatable ink roller 46, ink blade 47 extending along the ink roller 46 for holding a supply of ink 48 against the roller 46, and a plurality of positioning members 49 engaging the lower portion of the ink blade, so that axial adjustment of the positioning members 49 controls the distance between the lower end of the ink blade and the ink roller. While only one such positioning member is illustrated in FIG. 6, it will be apparent that a plurality of such positioning members are provided, as indicated in FIG. 5, throughout the length of the ink blade. Each positioning member 49 has an enlarged threaded spindle 50 supported in a threaded aperture in the frame 21' of the ink metering device, and a multi-profile coupling 51 is mounted within the spindle, in the manner illustrated in FIG. 37, with the couplings 51 being directly connected to separate shafts $25^6$ of stepping motors $26^6$. As illustrated in FIG. 5, it is seen that a plurality of stepping motors $26^6$ are provided, cooperating with separate positioning members, for controlling the position of the ink blade throughout its length. Axial movement of the positioning member 49 in the direction thereof which tends to reduce the spacing between the ink blade and the roller 46 is limited by a projection 52 on the frame 51 of the ink metering device.

An arrangement for controlling the printing pressure between cylinders of a printing press, such as the printing press of FIG. 1, by means of stepping motors, is illustrated in FIGS. 7 and 8. In this arrangement, the printing cylinder 15 (see FIG. 1) is fixedly mounted for rotation in the frame 31 of the printing machine by suitable means (not shown) and the offset cylinder 19 is mounted in the frame 31 for positioning by means of eccentric bearings 55. The eccentric bearings 55 have lever arms 56 for rotating the bearings 55, so that, as a result of the eccentric mounting of the axis of the offset cylinder 19, the offset cylinder may be moved into or out of engagement with the printing cylinder 15. For example, as illustrated in FIG. 8, when the arm 56 is moved in a clockwise direction, the offset cylinder is moved to an "on" position, i.e., in contact with the printing roller 15, and when the arm 56 is moved in a counterclockwise direction, it is moved to an "off" position, i.e., with the offset cylinder out of contact with the printing cylinder 15. The travel of the arm 56 in the "off" direction is limited by a fixed stop 57 mounted to the printing machine frame by suitable means. A stepping motor $26^8$ is mounted to another wall of the frame 31 of the printing machine, and the shaft $25^8$ of the stepping motor is coupled by means of gears 28 and 29, in the manner illustrated in FIG. 2, to a positioning member shaft $27^8$, by way of a multi-profile coupling 30. The shaft $27^8$ is also provided with a threaded spindle 32 and knob 35, in the manner illustrated in FIG. 1. As shown in FIG. 8, the end of the positioning member shaft 27 serves as a stop for the arm 56 in the "on" direction, this stop being adjustable in a stepwise manner by means of the stepping motor $26^8$. The movement of the arms 56 may be accomplished by any suitable means, and the position of the shaft $27^8$ is thus a limit for of the pressure between the rolls 15, 19 in the "on" position.

An arrangement for employing the stepping motor system of the present invention in the adjustment of registration in a printing press is illustrated in FIG. 9. In this arrangement, the plate cylinder 20 (see FIG. 1) is rotatably supported on a hub 60, which in turn is supported for rotation in the frame 31 of the printing machine. The hub 60 has a threaded portion adapted to engage threads in the aperture in the frame 31. A first stepping motor 61 is attached to the frame 31, the shaft 62 of the stepping motor being directly coupled, by way of coupling 63, to a gear 64. The gear 64 drives a gear 65 on the hub 60, to effect the rotation, and hence axial displacement of the hub 60 due to the threads on the hub. The stepping motor 61 thereby effects the stepwise axial displacement of the plate cylinder 20. Rotation of the hub 60 due to operation of the stepping motor 61 is not coupled to the printing plate cylinder 20. A second stepping motor 66 is also provided affixed to the frame 31, the shaft 62 of the stepping motor 66 being directly coupled, by way of coupling 67 to drive a gear 68. The gear 68 drives a gear 69 affixed to a shaft 70 which extends through the hub 60 and the plate cylinder 20. One end of the shaft 71 is provided with threads 70 which engage threads in a fixed plate 72, so that rotation of the shaft 70 due to operation of the stepping motor 66 is accompanied with stepwise axial displacement of the shaft 70. Axial displacement of the shaft 70 is coupled to a helically toothed drive gear 72 by way of a slip coupling 73, so that rotation of the shaft 70 is not coupled to the gear 72. The helical gear 72 is coupled to a drive flange 73' connected to a hub 74 affixed to the end of the plate cylinder 20, so that, due to the helical arrangement of the teeth on gear 72, operation of the stepping motor 66 effects a stepwise rotation adjustment of the plate cylinder 20. The plate cylinder 20 may be driven by means of a drive gear 75 coupled to external teeth on the helical drive gear 72. The drive flange 73' is provided with an adjusting spring 76.

In addition to the above applications of the use of stepping motors in printing presses, it will be apparent that such stepping motors may be also advantageously employed, for example, in the adjustment of inking rollers, wet agent dosing devices, stack lifting and lowering devices, and the application and release of pressure on printing presses, as well as in any application where machine parts are to be provided with stepwise intermittent rotation or axial movement.

FIG. 10 illustrates a control network 80 for use in the control of stepping motors according to the invention. The control network 80 has an input terminal 81 to which input pulses are applied. The input terminal 81 is connected to one input of AND gate 82. The output of AND gate 82 is connected to one input of OR gate 83. The output of OR gate 83 is connected to an amplifier 84, and also to one input of an AND gate 85. The output of the AND gate 85 forms the second input of OR gate 83. The output of the amplifier 84 is connected to an output terminal 86, and, by way of inverter 87, to an output terminal 88. The output of amplifier 84 is also connected to a delay stage 89, the output of which is applied to an amplifier 90. The output of amplifier 90 is connected to an output terminal 91, and by way of inverter 92 to an output terminal 93. In addition, the output of the amplifier 90 is also supplied by way of a delay stage 94 to an inverter 95, and the output of the inverter 95 forms the second inputs of the AND gates 82 and 85.

In order to simplify nomenclature in the following description of the circuit of FIG. 10, the input terminal 81 signal will be designated $x$, the signal output at terminal 86 will be designated $y_1$, the signal output at terminal 88 will be designated $\bar{y}_1$, the signal output at terminal 91 will be designated $y_2$, and the signal output at terminal 93 will be designated $\bar{y}_2$. In addition, as will be explained in more detail in the following disclosure, the terminals 86 and 88 are adapted to be connected to one stator winding of a stepping motor, and the terminals 91 and 93 are adapted to be connected to a second stator winding of the same stepping motor. In the unexcited state of the system, terminals 86 and 91 have the signal level 0, and terminals 88 and 93 have the signal level 1, so that current flows, in the unexcited state, from terminal 88 to terminal 86, and from terminal 93 to terminal 91, by way of the respective stator windings. Furthermore, the input to the amplifier 84 is denoted signal path A, and the second input path to the input AND gate 82 is herein referred to as signal path B.

The operation of the control network 80 of FIG. 10 will now be explained. Assume initially that the circuit is in the unexcited state, with the outputs $y_1$ and $y_2$ being 0 and the outputs $\bar{y}_1$ and $\bar{y}_2$ being 1, and the signal in the signal path B hence being 1. If a pulse of given duration is now applied at the input x of the control network, the output of the AND circuit 82 will assume the signal level 1, since $x = B = 1$. The signal level 1 is passed on, by way of OR circuit 31 and amplifier 32, to the $y_1$ output, and therefore the output $\bar{y}_1$ will assume the signal level 0 due to the inverter 87. Consequently, current according to the assumed definition, will now flow from terminal 86 to terminal 88. The signal level 1 is also passed on, with a given delay in delay circuit 89, to amplifier 90, and thence to terminal 91. Consequently, the signal $y_2$ will assume the state 1, and the signal $\bar{y}_2$ will become 0, so that, subsequent the reversal of current between the terminals 86 and 88, the current between the terminals 91 and 93 also reverses. After a second delay, due to the delay circuit 94, the signal 1 output of the amplifier 90 is applied to the inverter 95, so that consequently the signal 0 is applied to the second inputs of the AND circuits 82 and 85. The output of the AND circuit 82 consequently returns to signal 0. The output of AND circuit 85 is 0, and since both inputs to the OR circuit 83 are now 0, signal path A carries the signal 0.

The output of amplifier 84 thus returns to signal 0, which is applied to terminal 86, so that $y_1$ becomes 0, and $\bar{y}_1$ becomes 1. The current between terminals 86 and 88 therefore reverses again, to flow from terminal 88 to terminal 86. Return of the output of amplifier 84 to signal 0 is also transmitted, with the delay due to delay circuit 89, to terminal 91 by way of amplifier 90, and consequently the current between terminals 91 and 93 reverses again to flow from terminal 93 to terminal 91. The signal 0 at the output of amplifier 90 is then applied, with a delay due to the delay circuit 94, to the inverter 95, so that the signal path B has a signal 1. As above stated, the input X has a determined duration, and if the pulse X is now absent, the output of AND circuit 82 will remain at 0. Further, since the signal at signal path A is 0, there will be an inequality at the input of the AND circuit 85, so that both inputs to the OR circuit 83 will remain at signal 0, and hence further signal changes in the circuit will stop. It is therefore apparent that following the application of an input pulse X to the input terminal 81, the currents in the output circuits have followed a reversal sequence and returned to their original states, whereupon no further changes occur without further input excitation. The AND circuit 85 serves the function of maintaining the signal in signal path A at 1 during the first portion of the cycle of the circuit in the event that the pulse X has a duration shorter than the sum of the delays of the delay circuits 89 and 94.

Each stepping motor 26, of the type employed in the arrangements of FIGS. 2 through 9, has a pair of stator windings. The stepwise rotation of the rotor of these motors is caused by reversing the direction of current flow in the stator windings. For example, if the terminals 86, 88 of one winding (FIG. 10) are designated $a$, $b$, and the terminals 91, 93 of the second winding are designated $c$, $d$, the stepwise rotation of the rotor is effected by changing the current flow direction in the first winding from $a$ to $b$ into $b$ to $a$, then changing the current flow in the second winding from $c$ to $d$ into $d$ to $c$, then reversing the current again in the first winding, followed by a reversal of the currents in the second winding.

In order that a conventional stepping motor executes one step in the desired direction of rotation in response to input direct current pulses, the pulses must be applied to the two stator windings in a rigidly prescribed sequence with the correct polarity, i.e., the direction of current flow of the previously executed step and the position of rotor, respectively, must be stored, so that after four executed steps the rotor has electrically returned to the same position relative to the stator.

In the arrangement according to the invention, the usual storing of the rotor position is eliminated by employing the control network 80 of FIG. 10 to correctly effect the necessary current reversals in the proper sequence in response to a single input pulse, so that the four steps are executed successively as if only one step were actually occurring. In addition, by employing the circuit of FIG. 10, it is possible to employ one control network for the control of any desired number of stepping motors.

In the arrangement according to the present invention, the control network 80 is connected, for example, so that the terminals $a, b$ of the first stator winding of each stepping motor 26, 26', are connected to the output terminals 86, 88 respectively, and the terminals $c, d$ of the second stator winding of the stepping motor are connected to the output terminals 91, 93. In order to more clearly explain the operation of the system, the directions of current flow in the stator windings of each partial step to be executed, and the corresponding output pulses from the control network 29, are shown in the following table.

| Step | Partial step | Input pulse to control network | Output pulse of control network | | | | Direction of current flow in stator windings of stepping motor | |
|---|---|---|---|---|---|---|---|---|
| | | | $y_1$ | $\bar{y}_1$ | $y_2$ | $\bar{y}_2$ | First stator winding | Second stator winding |
| I | 4=0 | X | 0 | 1 | 0 | 1 | b → a | d ← c |
| | 1 | | 1 | 0 | 0 | 1 | b ← a | d ← c |
| | 2 | | 1 | 0 | 1 | 0 | b ← a | d → c |
| | 3 | | 0 | 1 | 1 | 0 | b → a | d → c |
| | 4=0 | | 0 | 1 | 0 | 1 | b → a | d ← c |

In order to obtain a clockwise rotation of the motor, the first current reversal in the sequence must occur in the first stator winding, and in order to obtain a counterclockwise rotation, the first current reversal in this sequence must occur in the second stator winding.

As may be seen from the table, step 1, i.e., the first complete step of rotation of the motor, is divided into partial steps 0 to 4, and it is apparent that the directions of current flow in the stator windings for the partial step 0 correspond to those for the partial step 4, i.e., the rotor exhibits the same electrical position relative to the stator in steps 0 and 4. In accordance with the assumed nomenclature, signal potential 1 at the output $\bar{y}_1$ and signal level 0 at the output $y_1$ corresponds to current flow from terminals $b$ to $a$ in the first stator winding, and signal level 1 at output $\bar{y}_2$ and signal level 0 at the output $y_2$ corresponds to current flow from terminals $d$ to $c$ in the second stator winding. It is apparent then that the control network 80 of FIG. 10 provides the required successive output current reversals to effect a complete stepwise operation of the stepping motors in response to a single input pulse of determined duration.

Figure 11:
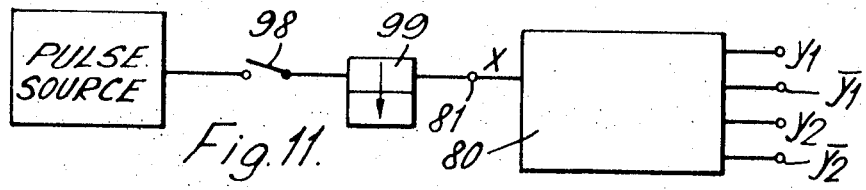
FIG. 11 is a block diagram of a control system for the network of FIG. 10, adapted for single step movement.
Figure 12:
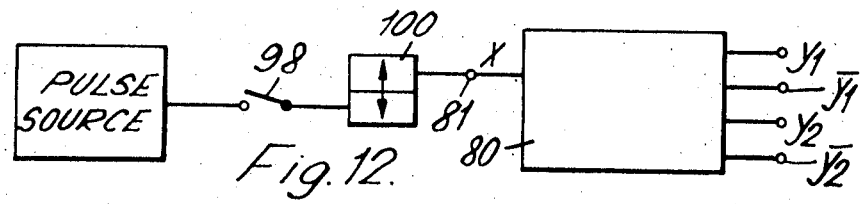
FIG. 12 is a block diagram of a control system for the network of FIG. 10, adapted for periodic, continuous movement.
Figure 13:
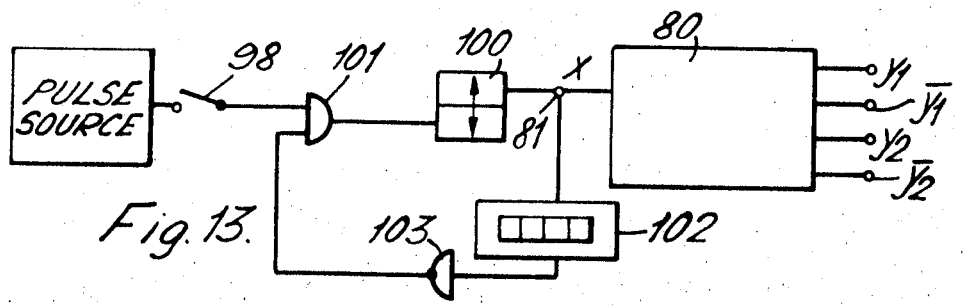
FIG. 13 is a block diagram of a control system for the network of FIG. 10, adapted for periodic, continuous movement, with means for preselecting the number of steps to be executed.

FIGS. 11 – 13 illustrate various input circuits that may be employed in combination with the control network 80 of FIG. 10. These figures illustrate switches 98, which may be manually or machine operated input devices, for applying pulses of undefined parameters to the control network. In the arrangement of FIG. 11, the pulses are fed, by way of input number 98, to a monostable multivibrator 99 for conversion into a pulse of determined duration for application to the control network 80. In the arrangement of FIG. 12, the pulses are applied by way of the input member 98 to an adjustable astable multivibrator 100, with the output of the multivibrator 100 being applied to the control network 80. This arrangement provides periodic, continuous motion, for example, for the intermittent drive of the ink and wetting agent drop roller. The pulses applied to the multivibrator 100 are converted by the astable multivibrator into pulses of determined duration, thereby permitting adjustment of the pulse frequency, and therefore the switching frequency of the drive members of the printing machine. In order to provide means for periodic, continuous motion with an adjustable number of steps, for example, for the simultaneous motion of all ink zone screws by a given amount, an adjustable astable multivibrator 100 and an AND circuit 101 (FIG. 13), are provided in combination with the network 80. In this arrangement, the undefined pulses are applied by way of the input member 98 to one input of the AND circuit 101, and the output of the AND circuit is applied to energize the astable multivibrator 100. The output of the multivibrator 100 is applied to a counter 102 having a presettable pulse output, the output of the counter being applied to the second input of the AND circuit 101 by way of inverter 103. The output of the astable multivibrator is also applied to the control network 80. In this arrangement, in the quiescent state, the output of the inverter 103 has a signal level 1. If a pulse is applied to the first input of the AND circuit 101, the output of the AND circuit will be at signal level 1, (since both of the inputs to this circuit have the signal level 1) and hence the multivibrator 100 will be energized to produce a pulse train. The pulses, which are applied to the network 80, are also counted in the adjustable counter 102, and when the preset pulse number is reached in the pulse counter, a pulse output signal level 1 is applied to the inverter 103. Due to the inversion in the inverter 103, the AND gate 101 will be blocked, and consequently the multivibrator 100 will be deenergized. The counter 102 can be reset by any conventional means to render the circuit responsive to further input pulses.

Figure 14:
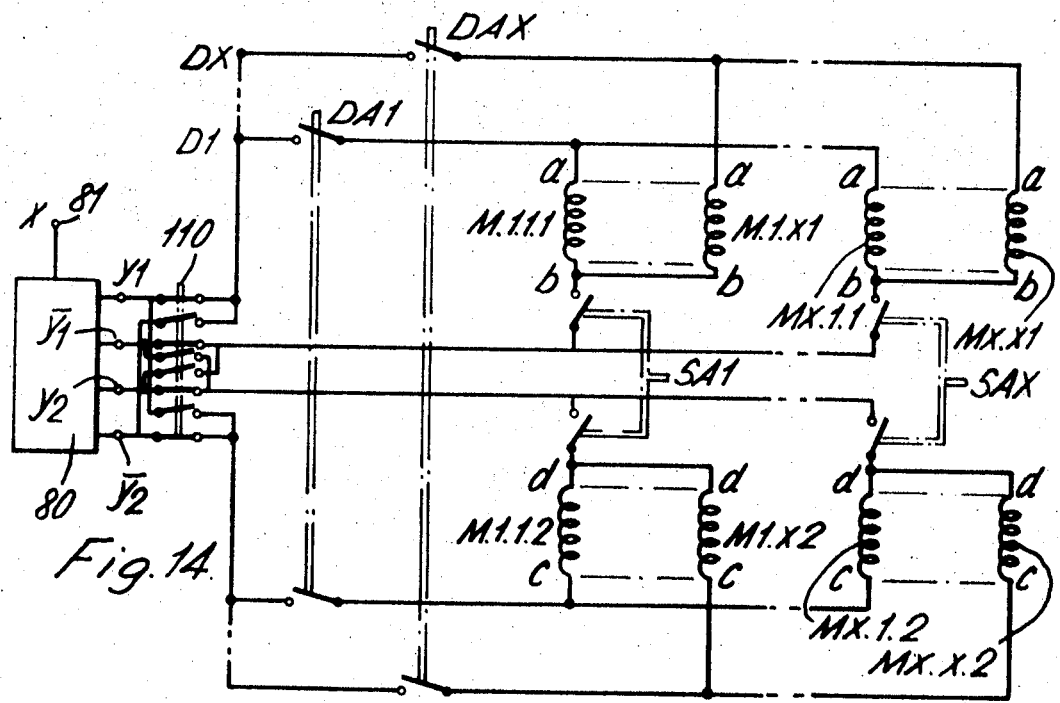
FIG. 14 is a circuit diagram illustrating a manner in which a plurality of stepping motors in an ink dispensing system may be controlled according to the invention.

FIG. 14 illustrates a manner in which the control network 80 may be connected to control a plurality of stepping motors arranged, for example, at the ink metering devices of multi-color printing presses. The multi-color printing press has a plurality of printing stations, with an ink metering device at each station. Each ink metering device (FIG. 6) has a number of ink zone screws 50, for example thirty, the number varying according to the format to be printed. In such an arrangement the outputs $y_1, \bar{y}_1, y_2$ and $\bar{y}_2$ of the control network 80 are connected to a reversing switch 110, the switch being connected to control the direction of rotation of the stepping motors 26⁶.

In the nomenclature of the stepping motor windings employed in FIG. 14, the first stator winding of the first stepping motor of the first station is designed M111, and the second stator winding of this motor would be designated M112. The designation of the other stator windings of the stepping motors in each case of the individual stations is analagous, with the first figure M111 or M112 representing the characteristic number for the stepping motor, the second figure a characteristic number for the station, and the last figure M1X1 or M1X2 a characteristic number for the stator winding. As indicated previously, the leads of the first stator winding of each motor are designated $a, b$, and those of the second stator winding of the stepping motors are designated $c, d$. In the first switch position, for clockwise running of the motors, the reversing switch 110 connects the output $y_1$ with the leads $a$ of all of the stator windings, the output of $\bar{y}_1$ with the leads $b$ of all stator windings, the output of $y_2$ with the leads $d$ of all stator windings, and the output $\bar{y}_2$ with the leads $c$ of all stator windings. In the second switch position, corresponding to counterclockwise winding of the motors, the reversing switch 110 connects the output $y_1$ with the leads $c$ of all stator windings, the output $\bar{y}_1$ with the leads $d$ of all stator windings, the output $y_2$ with the leads $b$ of all stator windings, and the output $\bar{y}_2$ with the leads $a$ of all stator windings.

The current paths through the leads of all stator windings are subdivided, so that all ink zone screw stepping motors of one printing station are connected to one partial current path identifiable as $D_N$, where D represents the partial current path, and N corresponds to the number of the printing station. Thus, $D_1$ in FIG. 14 corresponds to the first printing station 1, and $D_X$ corresponds to the printing station X. The partial current paths for each printing station are always associated with a station selection control member identifiable as $DA_N$, wherein DA corresponds to the control member, such as a switch, and N corresponds to the number of the printing station. The current paths to the leads $c$ of all second stator windings are formed in a similar manner.

The leads $b$ of all of the first ink zone screw stepping motors are interconnected, and the leads $b$ of the $X^{th}$ ink zone screw stepping motors are likewise connected with each other. The combined leads b are connected to the control network output $\bar{y}_1$ or $y_2$, respectively, by way of stepping motor control numbers $SA_1$ to $SA_X$. The leads $d$ are interconnected and are connected to the control network output $\bar{y}_1$ and $y_2$, respectively in a similar manner.

Figure 15:
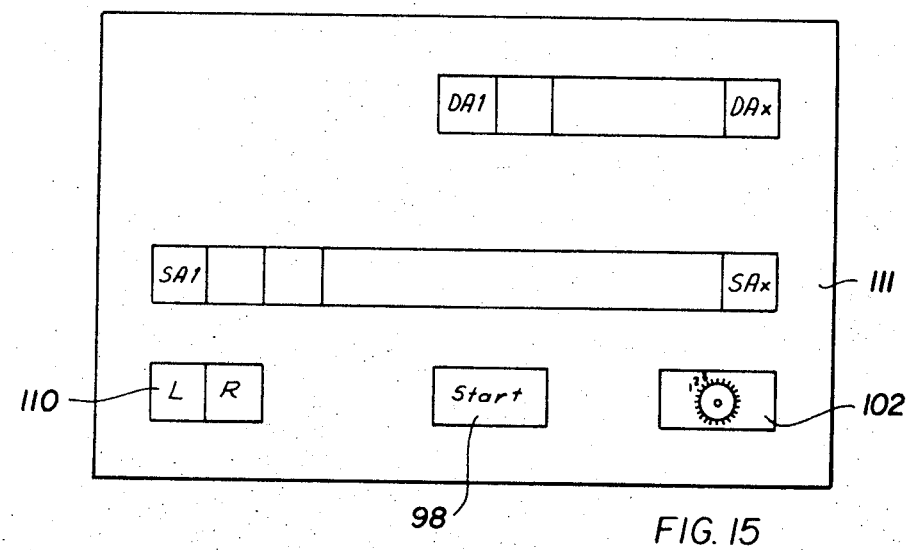
FIG. 15 is an illustration of a central control console panel which may be employed for controlling a circuit according to FIG. 14.

The control panel for the switches of the circuit of FIG. 14 is illustrated in FIG. 15. This control panel 111 includes the printing station selection control members $DA_1$ to $DA_X$, the stepping motor control members $SA_1$ to $SA_X$, the direction of rotation reversing switch 110, and input member 98 labelled "start" (see FIGS. 11 – 13), as well as the counter 102 of FIG. 13 for providing a presettable pulse output.

By means of the arrangement of the control elements in accordance with the invention, the number of control elements is limited to a minimum number, and it is apparent that the following basic variations are possible:

1. Adjustment of a given ink zone screw at one or several printing stations, selectable at will, with or without preselection of the number of steps to be executed.

2. Adjustment of a given group of ink zone screws, or all ink zone screws at one or several printing stations selectable at will, with or without preselection of the number of steps to be executed.

It is apparent that each of the basic control arrangements above permit control according to four selectable operation modes.

The manually operable control elements DA, SA, 98 and 110, arranged on control panel 111, can be replaced by sensors which, for example, measure the thickness of the ink film on the picture carrier and generate corresponding control pulses, by way of comparison with a reference film thickness, so that the control of the stepping motors may be integrated into control loops.

Figure 16:
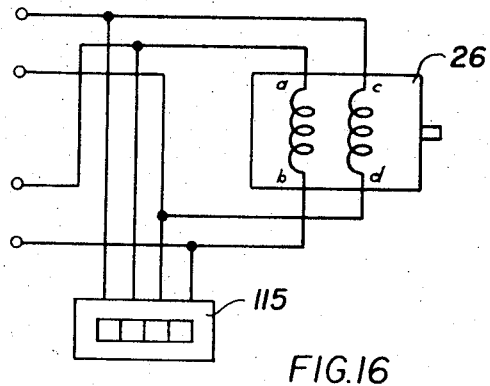
FIG. 16 is a circuit diagram illustrating a circuit for indicating the position of a stepping motor, and employing a counter.
Figure 17:
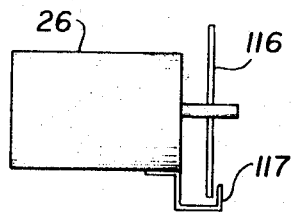
FIG. 17 is a side view of a typical stepping motor, and showing a code disk adapted to indicate the position of the stepping motor.
Figure 18:
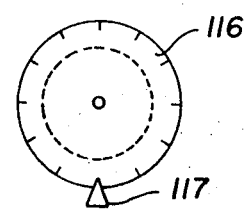
FIG. 18 is a front view of the stepping motor and code disk assembly of FIG. 17.

FIGS. 16 – 18 illustrate various arrangements of the elements for indicating the position of the various positioning members. In FIG. 16, the position of the positioning members arranged at the stepping motor 26 is indicated by means of a forward and backward counting pulse counter 115. The pulse counter 115 is connected to the leads $a$, $b$, $c$ and $d$ of the stepping motor. The number of pulses fed to the stepping motor (clockwise operating pulses minus counterclockwise operating pulses), is indicated by the counter, thereby providing a measure of the position of the positioning members. The pulse counter can be positioned in the proximity of the positioning members, or alternatively may be mounted on the control panel 111 of FIG. 15.

In FIGS. 17 and 18, the position of the positioning members corresponding to the stepping motors 26, is indicated by means of a code disk 116 and a pointer 117. The code disk can be mounted either directly at the stepping motor 26 connected to the corresponding positioning member, or at a second stepping motor unit 102 mounted on the control panel 111, which is connected to run synchronously with the stepping motor at the positioning member. Alternatively, of course, the second stepping motor may be run at a constant integral transmission ratio with respect to the first stepping motor.

As previously stated, manual operating controls, such as the control 35 of FIG. 1, may be provided for controlling the positioning members. In the event that the stepping motors are not to be rotated when the positioning members are controlled by the manual knob 35, the manual operating elements 35 can be associated with input members which actuate couplings arranged between the stepping motors and their respective gear units, and which interrupt the connection between the positioning member and the corresponding stepping motor.

What is claimed is:

1. Apparatus for remote control of a series of controllable positioning and drive members in a printing machine, said apparatus comprising:
    a series of step motors, each motor of said series having a rotor mechanically coupled to a corresponding one of said controllable members, and having two stator windings;
    a single source of a primary electrical pulse of determined duration;
    a single control network having means for producing, in response to said primary pulse, a cycle of control pulses; and
    additional network means for simultaneously applying said control pulses of said cycle to each motor of said series so that the rotor of each motor of said series is rotated in a cycle of steps corresponding to such control pulses and is thereupon, cyclically, in the same electrical precision relative to the stator thereof, whereby each positioning or drive member is moved in uniform individual steps thereof while different ones of said members can perform steps of different length, direction, and other arrangement, for example along rotary or rectangular paths.

2. The apparatus of claim 1 comprising gear means for coupling the rotors of said stepping motors to said controllable members.

3. The apparatus of claim 2 for the stepwise longitudinal movement and intermittent rotation of said controllable members, wherein said machine has a frame, comprising threaded spindle means for each of said controllable members in said frame, and further comprising multi-profile coupling means for coupling said spindle means to said controllable member.

4. The apparatus of claim 1 for the stepwise movement of said controllable members, wherein said machine has a frame, comprising threaded bushing means for supporting each controllable members in said frame by means of external threads on said bushing means, and multi-profile coupling means coupled interiorly of said bushing means for coupling said rotors of each stepping motors to the corresponding controllable members.

5. The apparatus of claim 1 wherein said control network comprises an input terminal for said primary pulse, a first AND circuit having one input connected to said input terminal, an OR circuit having one input connected to the output of said first AND circuit, a first inverter, first amplifier means connected to apply the output of said OR circuit to one end of each first stator winding and, by way of said first inverter to the other end of each first stator winding, a second inverter, first delay means and second amplifier means connected between the output of said first amplifier means and one end of said second stator winding, and by way of each second inverter to the other end of each second stator winding, second delay means and a third inverter connected to apply the output of said second amplifier to the second input of said first AND circuit, a second AND circuit having a first input connected to the output of said OR circuit and a second input connected to the output of said third inverter, and means applying the output of said second AND circuit to the second input of said OR circuit.

6. The apparatus of claim 5 for single step movement wherein said means applying said primary pulse to said control network comprises an input control member, and a monostable multivibrator controlled by said control member and having an output connected to said input terminal.

7. The apparatus of claim 5 for periodic continuous motion of said controllable member, wherein said means applying said primary pulse to said control network comprises a control member, and an adjustable astable multivibrator connected to be controlled by said control member and having an output connected to said input terminal.

8. The apparatus of claim 5 for the periodic continuous control of said controllable member with preselection of the number of steps in a control sequence, wherein said means applying said single pulse to said control network comprises a control member, an astable multivibrator having an output connected to said input terminal, a counter having an input connected to the output of said astable multivibrator, said counter having a preselectable pulse output, a fourth AND circuit, inverter means for applying said pulse output of said counter to one input of said fourth AND circuit, means connecting said control member to a second input of said fourth AND circuit, and means applying the output of said fourth AND circuit to said astable multivibrator for controlling the operation thereof.

9. The apparatus of claim 1 comprising means foindicating the position of said controllable members, said position indicating means comprising a forward and backward counting pulse counter, and means connecting said counter to said stepping motors, whereby the number of switching pulses transmitted by said control network is determinable by said pulse counter.

10. The apparatus of claim 1 comprising means for indicating the position of said controllable members, said indicating means comprising code disk means coupled to the rotor of one of said stepping motors, and pointer means for indicating the position of said code disk means.

11. The apparatus of claim 1 for the control of controllable members at each station of a multi-color printing machine, comprising a control panel, a separate stepping motor coupled to each controllable member of said printing machine, and switch means at said control panel for selectively applying the output of said control network to said stepping motors, and for reversing the application of the output of said control network to said stepping motors, and wherein said means applying said single pulse to said control network comprises start input means positioned on said control panel.

* * * * *

PO-1050
(5/69)

UNITED STATES PATENT OFFICE
CERTIFICATE OF CORRECTION

Patent No. 3,746,957            Dated July 17, 1973

Inventor(s) Karl-Heinz Forster, Lothar Vetter, Hans Johne and Klaus Schanze

It is certified that error appears in the above-identified patent and that said Letters Patent are hereby corrected as shown below:

Column 14, line 63, change "rectangular" to --rectilinear--.
Column 15, line 26, change "said" to --each--; change "each" to --said--.
Column 16, line 7, change "single" to --primary--;
            line 19, change "foin-" to -- for in- --.

Signed and sealed this 19th day of November 1974.

(SEAL)
Attest:

McCOY M. GIBSON JR.          C. MARSHALL DANN
Attesting Officer             Commissioner of Patents